[12] United States Patent
Guo et al.

(10) Patent No.: US 12,356,225 B2
(45) Date of Patent: Jul. 8, 2025

(54) METHOD FOR SERVICE IDENTIFICATION AND TERMINAL DEVICE

(71) Applicant: GUANGDONG OPPO MOBILE TELECOMMUNICATIONS CORP., LTD., Guangdong (CN)

(72) Inventors: Yali Guo, Guangdong (CN); Jianhua Liu, Guangdong (CN); Haorui Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 407 days.

(21) Appl. No.: 17/993,504

(22) Filed: Nov. 23, 2022

(65) Prior Publication Data

US 2023/0093178 A1 Mar. 23, 2023

Related U.S. Application Data

(63) Continuation of application No. PCT/CN2020/115342, filed on Sep. 15, 2020.

(51) Int. Cl.
H04W 24/08 (2009.01)
H04W 4/02 (2018.01)
H04W 88/04 (2009.01)

(52) U.S. Cl.
CPC ............ *H04W 24/08* (2013.01); *H04W 4/023* (2013.01); *H04W 88/04* (2013.01)

(58) Field of Classification Search
CPC ..... H04W 24/08; H04W 4/023; H04W 88/04; H04W 92/18; H04W 76/23; H04W 4/20; H04W 4/50; H04W 76/14
See application file for complete search history.

(56) References Cited

U.S. PATENT DOCUMENTS

| 2018/0124633 | A1  | 5/2018  | Hwang et al. |
| 2018/0192433 | A1* | 7/2018  | Ouyang ............... H04W 76/12 |
| 2019/0254118 | A1  | 8/2019  | Dao et al. |
| 2020/0205209 | A1* | 6/2020  | Pan ....................... H04W 4/40 |
| 2020/0267790 | A1* | 8/2020  | Kim ...................... H04W 48/16 |
| 2020/0351699 | A1* | 11/2020 | Pan .................... H04W 28/0268 |
| 2021/0321227 | A1* | 10/2021 | Ge .......................... H04W 4/06 |

(Continued)

FOREIGN PATENT DOCUMENTS

| CN | 103780505 A | 5/2014 |
| CN | 107535011 A | 1/2018 |

(Continued)

OTHER PUBLICATIONS

Huawei, HiSilicon, PC5 QoS parameters provided by PCF, SA WG2 Meeting #133, S2-1905736, May 13-17, 2019. (7 pages).

(Continued)

*Primary Examiner* — Afshawn M Towfighi
(74) *Attorney, Agent, or Firm* — Young Basile Hanlon & MacFarlane, P.C.

(57) ABSTRACT

A method for service identification is provided. The method includes receiving a PC5 service of quality (QoS) rule from a peer terminal device, where the PC5 QoS rule includes a service filter and service information. The method further includes determining a service corresponding to received data by performing matching on the received data by using the service filter.

14 Claims, 10 Drawing Sheets

(56) References Cited

U.S. PATENT DOCUMENTS

| | | | | |
|---|---|---|---|---|
| 2022/0338205 | A1* | 10/2022 | Lee | H04W 28/0268 |
| 2023/0072379 | A1* | 3/2023 | Cheng | H04W 76/14 |

FOREIGN PATENT DOCUMENTS

| | | | |
|---|---|---|---|
| CN | 108924110 | A | 11/2018 |
| CN | 110366132 | A | 10/2019 |
| CN | 111065132 | A | 4/2020 |
| CN | 111510890 | A | 8/2020 |
| CN | 111586643 | A | 8/2020 |
| WO | 2016169002 | A1 | 10/2016 |
| WO | 2017028294 | A1 | 2/2017 |
| WO | 2017067007 | A1 | 4/2017 |
| WO | 2020087308 | A1 | 5/2020 |
| WO | 2020150876 | A1 | 7/2020 |

OTHER PUBLICATIONS

LG Electronics, TS 23.287 Clarification on PC5 QoS rule, SA WG2 Meeting #134, S2-1908215, Jun. 24-28, 2019. (11 pages).

International Search Report and Written Opinion with English Translation for PCT Application PCT/CN2020/115342 mailed Jun. 23, 2021. (18 pages).

Motorola Mobility, Lenovo, PC5 QoS Rules definition, SA WG2 Meeting #134, S2-1901907662, Jun. 24-28, 2019. (6 bages).

LG Electronics, Intel, SA2, Clarification on mapping relationship between V2X Service and PFI for a PC5 unicast link, 3GPP TSG-SA WG2 Meeting #138E, S2-2003059r05, Apr. 20-24, 2020. (11 pages).

Extended European Search Report for EP Application 20953537.6 mailed Jun. 14, 2023. (11 pages).

3GPP TS 23.287 V16.4.0 (Sep. 2020); Technical Specification; Technical Specification Group Services and System Aspects; Architecture enhancements for 5G System (5GS) to support; Vehicle-to-Everything (V2X) services; (Release 16). (58 pages).

Communication pursuant to Article 94(3) EPC issued in corresponding EP application No. 20953537.6 dated Nov. 17, 2023. (5 pages).

Ericsson, LG Electronics, "V2X Service Type", S2-2002852, 3GPP TSG-SA WG2 Meeting #138E, Apr. 20-24, 2020, 14 pages.

Fraunhofer HHI, Fraunhofer IIS, "L2 vs L3—Relay (re-)Selection, Quality of Service (QoS)", R2-2006639, 3GPP TSG RAN WG2 #111-e, Online, Aug. 17-28, 2020, 8 pages.

Chinese first office action with English translation issued in corresponding CN Application No. 202080098612.2, dated May 6, 2024, 40 pages.

Chinese Notice of Allowance with English translation issued in corresponding CN Application No. 202080098612.2, dated Jun. 28, 2024, 10 pages.

* cited by examiner

1100

1200

1300

METHOD FOR SERVICE IDENTIFICATION AND TERMINAL DEVICE

CROSS-REFERENCE TO RELATED APPLICATION(S)

This application is a continuation of International Application No. PCT/CN2020/115342, filed on Sep. 15, 2020, the entire disclosure of which is hereby incorporated by reference.

TECHNICAL FIELD

This disclosure relates to the field of communications, and more particularly, to methods for service identification and a terminal device.

BACKGROUND

A user equipment (UE) having a proximity-based services (ProSe) can communicate directly with another UE having a ProSe capability through a PC5 wireless interface. The two UEs respectively determine quality of service (QoS) requirements corresponding to service data transmission according to QoS requirements of services, and establish a PC5 QoS flow between the two UEs that can guarantee corresponding QoS requirements to transmit service data. Data of multiple services can be transmitted on one PC5 QoS flow, and data of one service can also be transmitted through multiple PC5 QoS flows. After a receiving UE receives data, the receiving UE can transmit all the data to a data processing unit (for example, an operating system, or a data processing unit shared by multiple applications) above a network layer, and the data processing unit can distinguish the data and transmit the data to a corresponding application. However, the receiving UE has a relatively strong dependence on the data processing unit, and when the assistance of the data processing unit cannot be obtained, the receiving UE cannot distinguish the data, so that the data cannot be transmitted to the corresponding application.

When a UE can be connected to an external data network through the fifth generation (5G) network and has a ProSe capability, the UE can serve as a relay UE, and another remote UE having a ProSe capability can establish a direct connection with the relay UE through a PC5 interface, and interacts with the external data network through a protocol data unit (PDU) session established between the relay UE and the 5G network. When a relay UE accesses the $3^{rd}$ generation partnership project (3GPP) network, the relay UE will consider services to be transmitted, and can set parameters of different PDU sessions or different QoS flows for different services. However, for data transmitted by a remote UE to a relay UE through a PC5 interface, the relay UE cannot distinguish services, so that the relay UE cannot correctly set parameters of a PDU session or QoS flow from the relay UE to the core network.

It can be seen that in the related art, in some cases, a receiving UE cannot identify service information, so that communication cannot be performed normally.

SUMMARY

Methods for service identification and a terminal device are provided in embodiments of the present disclosure.

A method for service identification is provided in embodiments of the present disclosure. The method is executed by a terminal device and includes the following. Receive a PC5 service of quality (QoS) rule from a peer terminal device, where the PC5 QoS rule includes a service filter and service information. Determine a service corresponding to received data by performing matching on the received data by using the service filter.

A method for transmitting service information is further provided in embodiments of the present disclosure. The method is executed by a terminal device and includes transmitting a PC5 QoS rule to a peer terminal device, where the PC5 QoS rule includes a service filter and service information, and the service filter is used for the peer terminal device to perform matching on received data to determine a service corresponding to the received data.

A terminal device is provided in embodiments of the present disclosure. The terminal device includes a transceiver, a processor, and a memory storing computer programs. The computer programs are executed by the processor to cause the transceiver to receive a PC5 QoS rule from a peer terminal device, where the PC5 QoS rule includes a service filter and service information. The computer programs are further executed by the processor to cause the processor to determine a service corresponding to received data by performing matching on the received data by using the service filter.

DETAILED DESCRIPTION

Figure 1A:
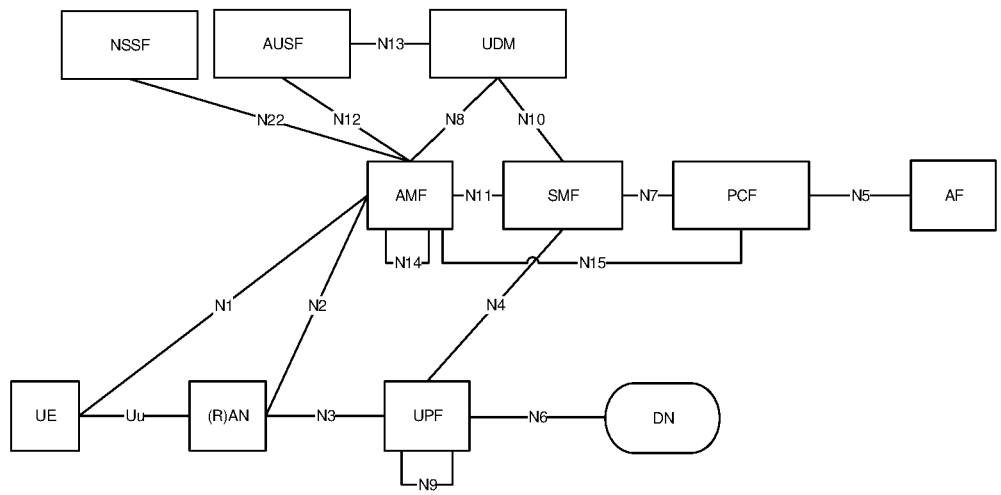
FIG. 1A is a schematic view illustrating application scenario 1 according to embodiments of the present disclosure.

The technical solutions in embodiments of the present disclosure will be described below with reference to accompanying drawings in the embodiments of the present disclosure.

It should be noted that the terms "first", "second", and so on in the description and claims of embodiments of the present disclosure and the above accompanying drawings are used to distinguish similar objects, and are not necessarily used to describe a specific order or sequence. Objects described by "first" and "second" may be the same or different.

The technical solutions of embodiments of the present disclosure can be applied to various communication systems, for example, a global system of mobile communication (GSM) system, a code division multiple access (CDMA) system, a wideband code division multiple access (WCDMA) system, general packet radio service (GPRS), a long term evolution (LTE) system, an advanced long term evolution (LTE-A) system, a new radio (NR) system, an evolution system of NR system, LTE-based access to unlicensed spectrum (LTE-U) system, NR-based access to unlicensed spectrum (NR-U) system, a universal mobile telecommunication system (UMTS), a wireless local area network (WLAN), wireless fidelity (WiFi), a 5th-generation (5G) system or other communication systems.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, etc., and embodiments of the present disclosure can also be applied to these communication systems.

Optionally, the communication system in embodiments of the present disclosure can be applied to a carrier aggregation (CA) scenario, and can also be applied to a dual connectivity (DC) scenario and a standalone (SA) scenario.

Applied spectrums are not limited in embodiments of the present disclosure. For example, embodiments of the present disclosure can be applied to licensed spectrums, and can also be applied to unlicensed spectrums.

In embodiments of the present disclosure, various embodiments are described in conjunction with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, a user device, etc. The terminal device may be a station (ST) in a WLAN, a cellular phone, a cordless phone, a session initiation protocol (SIP) phone, a wireless local loop (WLL) station, a personal digital assistant (PDA) device, a handheld device with wireless communication functions, a computing device or other processing devices connected to wireless modems, an in-vehicle device, a wearable device, and a next-generation communication system, such as a terminal device in an NR network or a terminal device in a future evolved public land mobile network (PLMN) network.

As an example but not limitation, in embodiments of the present disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets, smart jewelry, etc. for physical sign monitoring.

In embodiments of the present disclosure, the network device may be a device that is configured to communicate with a mobile device. The network device may be an access point (AP) in a WLAN, a base transceiver station (BTS) in a GSM or CDMA system, a NodeB (NB) in a WCDMA system, or an evolutional NodeB (eNB or eNodeB) in an LTE system. Alternatively, the network device may also be a relay station, an AP, an in-vehicle device, a wearable device, a generation NodeB (gNB) in an NR network, or a network device in a future evolved PLMN.

In embodiments of the present disclosure, the network device can provide services for a cell, and the terminal device communicates with the network device through transmission resources (e.g., frequency-domain resources or spectrum resources) used by the cell, where the cell may correspond to the network device (e.g., a base station). The cell may belong to a macro base station or a base station corresponding to a small cell, where the small cell may include a metro cell, a micro cell, a pico cell, a femto cell, and the like. These small cells have features of small coverage ranges and low transmission power and are suitable for providing high-speed data transmission services.

FIG. 1A is a schematic diagram illustrating application scenario 1 according to embodiments of the present disclosure. FIG. 1A exemplarily illustrates a 5G network system architecture. A UE performs access stratum (AS) connection with an access network (AN) through a Uu wireless interface, to exchange AS messages and perform wireless data transmission. The UE performs a non-access stratum (NAS) connection with an access and mobility management function (AMF) through an N1 interface, to exchange NAS messages. The AMF is a mobility management function in a core network, and a session management function (SMF)

is a session management function in the core network. In addition to mobility management of the UE, the AMF is also responsible for forwarding of session management-related messages between the UE and the SMF. A policy control function (PCF) is a policy management function in the core network, and is responsible for formulating policies related to mobility management, session management, and charging of the UE. A user plane function (UPF) is a user plane function in the core network, performs data transmission with an external data network through an N6 interface, and performs data transmission with the AN through an N3 interface.

After the UE accesses the 5G network through the Uu interface, the UE transmits service data through the network. When a service is initiated, a network layer of the UE obtains quality of service (QoS) requirements of the service from an upper layer (such as an operating system or an application). The UE converts the QoS requirements of the service into QoS parameters for the Uu interface, and performs data transmission through a QoS flow between the UE and the UPF under control of the SMF.

Figure 1B:
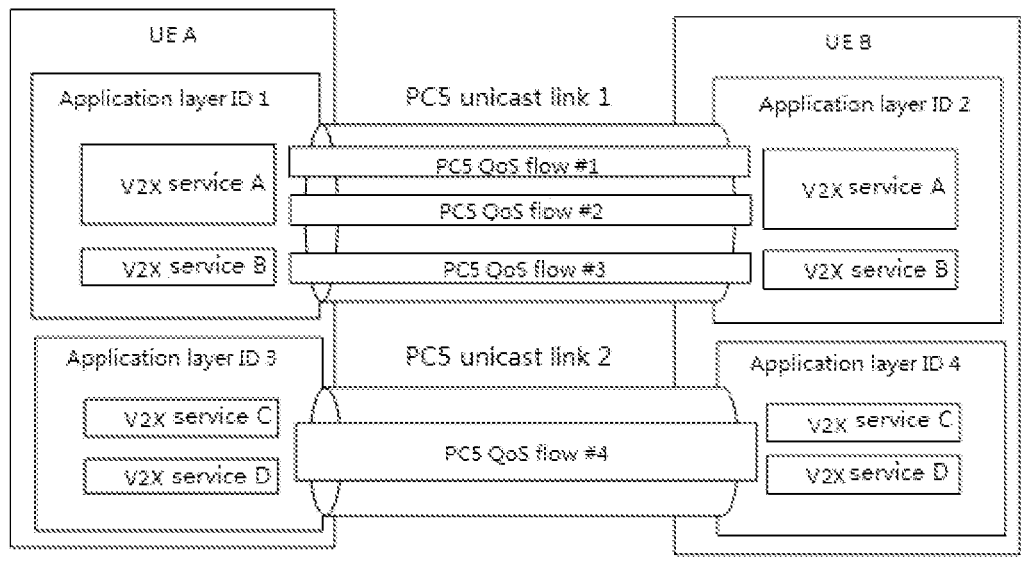
FIG. 1B is a schematic view illustrating application scenario 2 according to embodiments of the present disclosure.

FIG. 1B is a schematic diagram illustrating application scenario 2 according to embodiments of the present disclosure. FIG. 1B exemplarily illustrates an example of a PC5 unicast link between two UEs. As illustrated in FIG. 1B, a user equipment (UE) having a proximity-based services (ProSe) capability can communicate directly with another UE having a ProSe capability through a PC5 wireless interface. The two UEs respectively determine QoS requirements corresponding to service data transmission according to QoS requirements of services, and establish a PC5 QoS flow between the two UEs that can guarantee corresponding QoS requirements to transmit service data, so as to guarantee QoS of service in PC5 communication. Data of multiple services can be transmitted on one PC5 QoS flow, and data of one service can also be transmitted through multiple PC5 QoS flows.

Figure 1C:
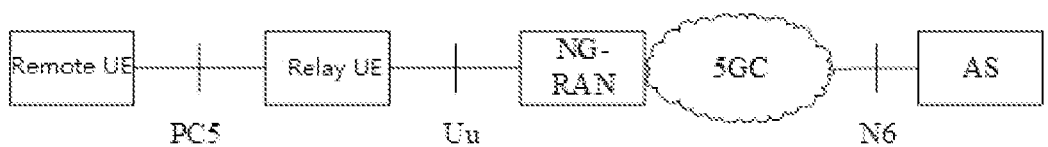
FIG. 1C is a schematic view illustrating application scenario 3 according to embodiments of the present disclosure.

When a UE can be connected to an external data network through a fifth generation (5G) network and has a ProSe capability, the UE can serve as a relay UE, and another remote UE having a ProSe capability can establish a direct connection with the relay UE through a PC5 interface, and interacts with the external network through a protocol data unit (PDU) session established between the 5G network and the relay UE. FIG. 1C is a schematic diagram illustrating application scenario 3 according to embodiments of the present disclosure. As illustrated in FIG. 1C, the remote UE establishes a PDU session with the 5G network through the relay UE, that is, a ProSe 5G UE-to-Network Relay.

The above three application scenarios are examples of scenarios to which the embodiments of the present disclosure may be applied, and the embodiments of the present disclosure are not limited to the above three application scenarios, and are not limited to 5G network scenarios.

It can be understood that, the terms "system" and "network" in the disclosure can be often used interchangeably. The term "and/or" in the disclosure is simply an illustration of an association relationship of associated objects, indicating that three relationships can exist, for example, A and/or B, which can indicate the existence of A alone, A and B together, and B alone. In addition, the character "/" in the disclosure generally indicates that associated objects are in an "or" relationship.

Figure 2:
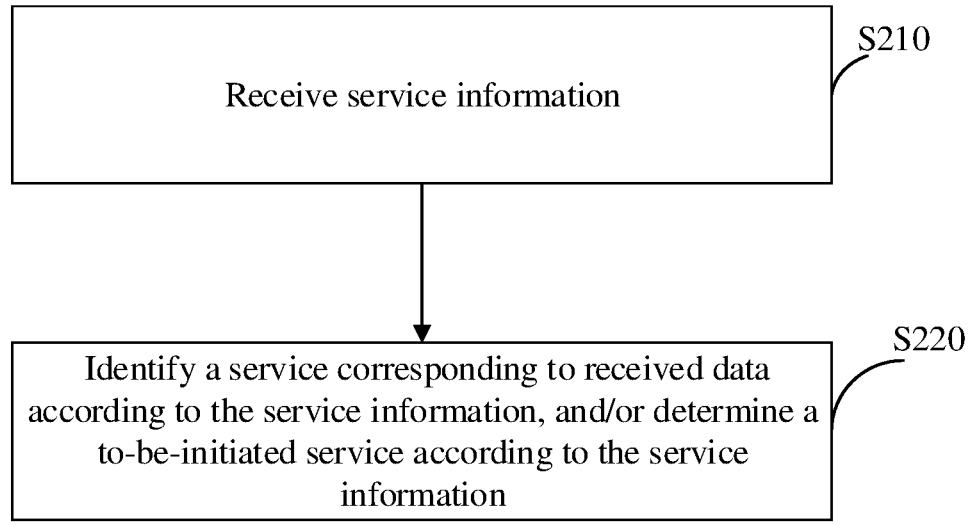
FIG. 2 is a flow chart illustrating implementation of a method 200 for service identification according to embodiments of the present disclosure.

A method for service identification is provided according to embodiments of the present disclosure. FIG. 2 is a flow chart illustrating implementation of a method 200 for service identification according to embodiments of the present disclosure. The method can be optionally applied to systems illustrated in FIGS. 1A to 1C, but is not limited thereto. The method includes at least part of the following.

At S210, receive service information.

At S220, identify a service corresponding to received data according to the service information, and/or determine a to-be-initiated service according to the service information.

The method can be applied to a terminal device.

In embodiments of the present disclosure, service information can be added to a PC5 QoS rule or a Uu QoS rule, or can be added to a data header, such that a UE that receives data can identify a service corresponding to the data, and then transmits the received data to a right upper layer application, or enables a UE-network relay (remote UE for short) to determine a service to be initiated by the remote UE, and thus suitable PDU session parameters or QoS parameters can be set.

Specifically, receiving the service information can include receiving a PC5 QoS rule, a Uu QoS rule, or data, where the PC5 QoS rule, the Uu QoS rule, or a data header of the data carries the service information.

Optionally, the service information includes at least one of: a service identifier (ID), a service code, an application ID, an ID of a service provider, a service type; or other ID able to be associated with the service information.

Optionally, the other ID able to be associated with the service information includes at least one of a slice ID, a domain name, or a differentiated services code point (DSCP).

In some embodiments, a terminal device receives a PC5 QoS rule from a peer terminal device, where the PC5 QoS rule includes a service filter and the service information. The terminal device determines the service corresponding to the received data by performing matching on the received data by using the service filter. Furthermore, the terminal device can transmit the received data to an application corresponding to the service.

Optionally, the terminal device receives the PC5 QoS rule from the peer terminal device as follows. The terminal device receives a PC5 QoS flow establishment or modification request from the peer terminal device, where the PC5 QoS flow establishment or modification request carries a PC5 QoS rule corresponding to a to-be-transmitted service in a to-be-established PC5 QoS flow.

The above embodiments can be applied to the scenario illustrated in FIG. 1B. The following will illustrate specific implementation manners by using embodiment 1.

Embodiment 1

Figure 3:
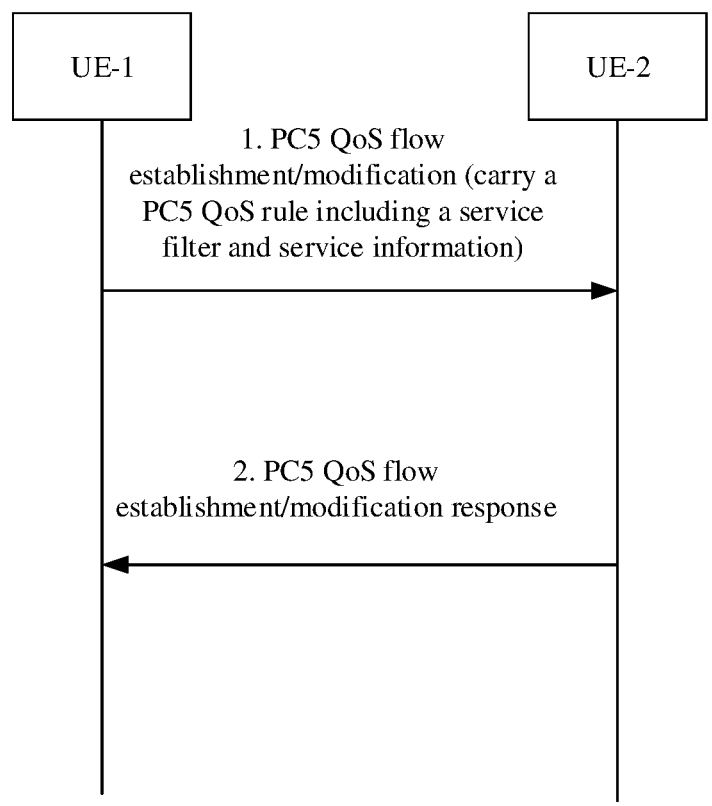
FIG. 3 is a flow chart illustrating implementation of embodiment 1 of the present disclosure.

FIG. 3 is a flow chart illustrating implementation of embodiment 1 of the present disclosure. As illustrated in FIG. 3, UE-1 and UE-2 establish connection through a PC5 interface.

When initiating a service, UE-1 requests peer UE-2 to establish or modify a PC5 QoS flow, and transmits an ID of a PC5 QoS flow to be established to UE-2. UE-1 further transmits to UE-2 a PC5 QoS rule corresponding to a to-be-transmitted service in the PC5 QoS, where the PC5 QoS rule includes a service filter and the service information. Specific contents of the service information have been illustrated in the above, which will not be repeated herein.

UE-2 feeds back to UE-1 a PC5 QoS establishment or modification response.

After PC5 QoS flow establishment or modification finishes, UE-1 transmits data to UE-2. UE-2 determines service information corresponding to received data by performing matching on the received data by using the service filter in the PC5 QoS rule, such that UE-2 can transmit the received data to a corresponding application.

In some implementation manners, the terminal device receives data from a peer terminal device, where a data header of the data carries service information. The terminal device determines a service corresponding to the received data according to the data header. Further, the terminal device can transmit the received data to an application corresponding to the service.

The above implementation manner can be applied to a scenario illustrated in FIG. 1B. The following will illustrate specific implementation manners by using embodiment 2.

Embodiment 2

Figure 4:
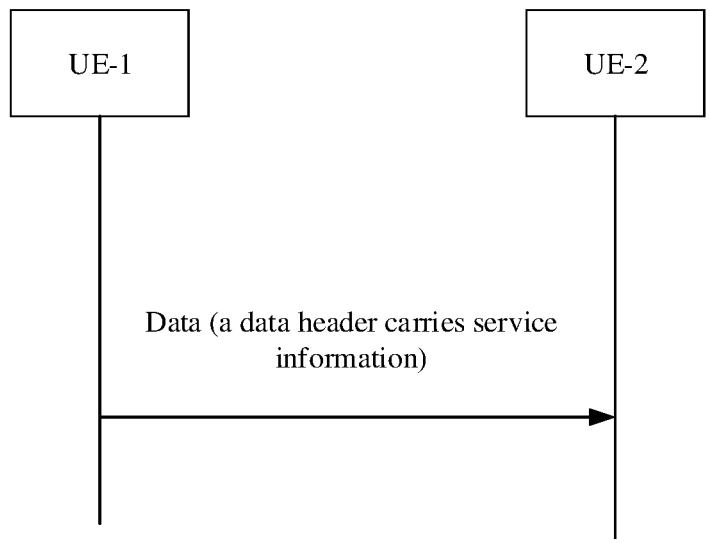
FIG. 4 is a flow chart illustrating implementation of embodiment 2 of the present disclosure.

FIG. 4 is a flow chart illustrating implementation of embodiment 2 of the present disclosure. As illustrated in FIG. 4, UE-1 and UE-2 pre-establish connection through a PC5 interface.

When UE-1 transmits data through the PC5 interface, UE-1 transmits data to peer UE-2, where a data packet of the data carries service information. Specific contents of the service information have been illustrated in the above, which will not be repeated herein. UE-2 can determine a service corresponding to the received data according to the data header. Further, UE-2 can transmit the received data to an application corresponding to the service.

In some implementation manners, the terminal device receives a Uu QoS rule from a network device, where the Uu QoS rule includes a service filter and service information. The terminal device determines the service corresponding to the received data by performing matching on the received data by using the service filter. Further, the terminal device can transmit the received data to an application corresponding to the service.

The above implementation manner can be applied to a scenario illustrated in FIG. 1A. The following will illustrate specific implementation manners by using embodiment 3.

Embodiment 3

Figure 5:
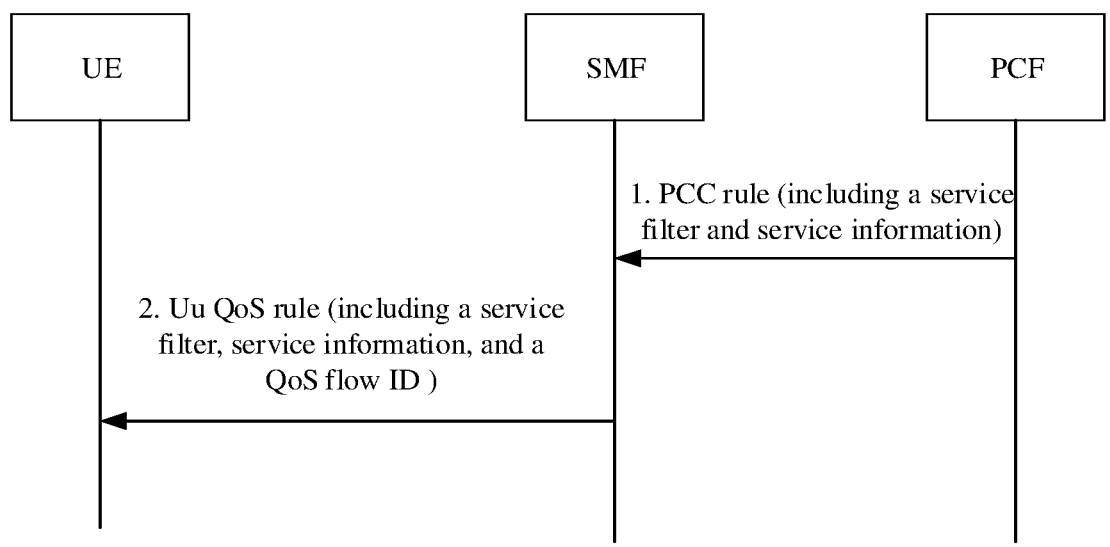
FIG. 5 is a flow chart illustrating implementation of embodiment 3 of the present disclosure.

FIG. 5 is a flow chart illustrating implementation of Embodiment 3 of the present disclosure. As illustrated in FIG. 5, UE accesses the 3rd generation partnership project (3GPP) network through a Uu interface.

When initiating a service, a PCF transmits a policy and charging control (PCC) rule to an SMF, where the PCC rule includes a service filter and service information. Specific contents of the service information have been illustrated in the above, which will not be repeated herein. The SMF determines a QoS flow corresponding to the PCC rule and generates a Uu QoS rule, where the Uu QoS rule includes the service filter, the service information, and a QoS flow ID. The SMF transmits the Uu QoS rule to the UE.

When data is transmitted from a network side to the UE, the UE determines a service corresponding to the received data by performing matching on the received data by using the service filter in the Uu QoS rule, such that the UE can transmit the received data to a corresponding application.

In some implementation manners, the terminal device receives data from the network device, where a data header of the data carries service information. The terminal device determines a service corresponding to the received data according to the data header. Further, the terminal device can transmit the received data to an application corresponding to the service.

The above implementation manner can be applied to the scenario illustrated in FIG. 1A. The following will illustrate specific implementation manners by using embodiment 4.

Embodiment 4

Figure 6:
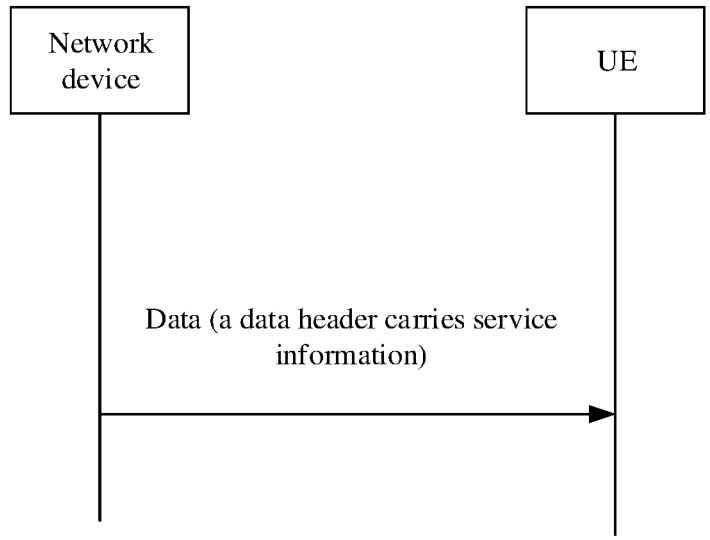
FIG. 6 is a flow chart illustrating implementation of embodiment 4 of the present disclosure.

FIG. 6 is a flow chart illustrating implementation of embodiment 4 of the present disclosure. As illustrated in FIG. 6, UE and a network device (such as an SMF and a UPF) establish connection.

The network device transmits data to the UE, where a data header of the data carries service information. Specific contents of the service information have been illustrated in the above, which will not be repeated herein. The UE determines a service corresponding to the received data according to the data header. Further, the UE can transmit the received data to an application corresponding to the service.

In some implementation manners, a relay UE receives a PC5 QoS rule from a remote UE, where the PC5 QoS rule includes service information. The relay UE determines a service to be initiated by the remote UE according to the PC5 QoS rule.

Further, the relay UE can request the network device to establish PDU session parameters or QoS parameters corresponding to the service to be initiated by the remote UE.

Optionally, the relay UE receives the PC5 QoS rule from the remote UE as follows. The remote UE receives a PC5 QoS flow establishment or modification request from the remote UE, where the PC5 QoS flow establishment or modification request carries a PC5 QoS rule corresponding to a to-be-transmitted service in a to-be-established PC5 QoS flow.

The above implementation manner can be applied to the scenario illustrated in FIG. 1C. The following will illustrate specific implementation manners by using embodiment 5.

Embodiment 5

Figure 7:
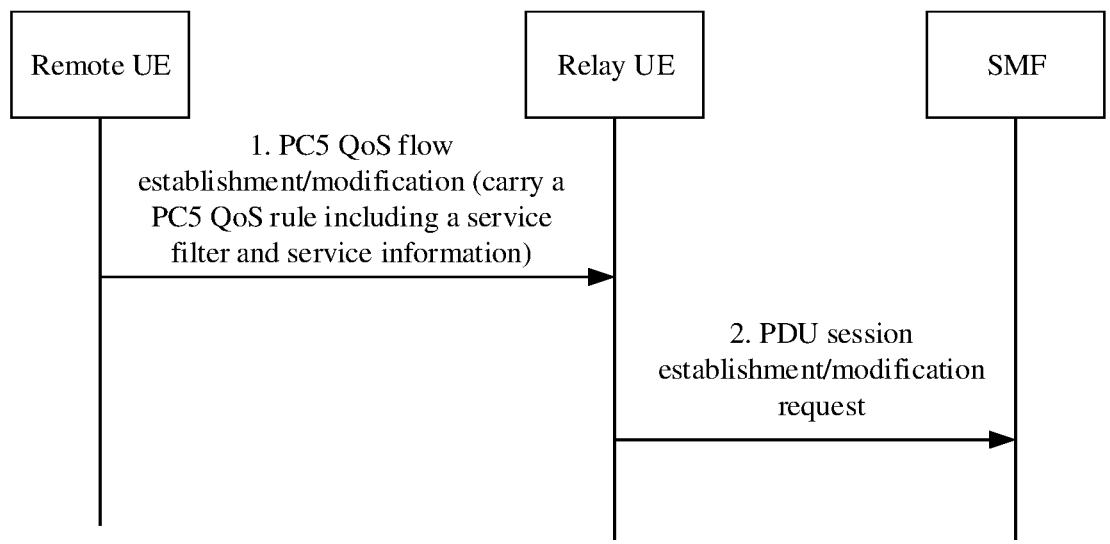
FIG. 7 is a flow chart illustrating implementation of embodiment 5 of the present disclosure.

FIG. 7 is a flow chart illustrating implementation of embodiment 5 of the present disclosure. As illustrated in FIG. 7, a remote UE actively initiates an establishment of a QoS flow.

When initiating a service, the remote UE requests a relay UE to establish or modify a PC5 QoS flow. The remote UE transmits an ID of a to-be-established PC5 QoS flow to the relay UE. The remote UE further transmits a PC5 QoS rule corresponding to a to-be-transmitted service in the PC5 QoS flow to the relay UE. The PC5 QoS rule includes a service filter and service information. Specific contents of the service information have been illustrated in the above, which will not be repeated herein.

The relay UE determines service information of a service to be initiated by the remote UE according to the PC5 QoS rule received from the remote UE, such that the relay UE can request a network to establish PDU session parameters or QoS parameters corresponding to the service to be initiated by the remote UE, for example, to determine a slice ID and a session and service continuity mode (SSC) of a PDU session, or to request corresponding QoS parameters.

In some implementation manners, the relay UE receives data from the remote UE, where a data header of the data carries service information. The relay UE determines a service corresponding to the received data according to the data header.

Further, the relay UE requests the network device to establish PDU session parameters or QoS parameters corresponding to the service corresponding to the received data.

The above implementation manner can be applied to the scenario illustrated in FIG. 1C. The following will illustrate specific implementation manners by using embodiment 6.

Embodiment 6

Figure 8:
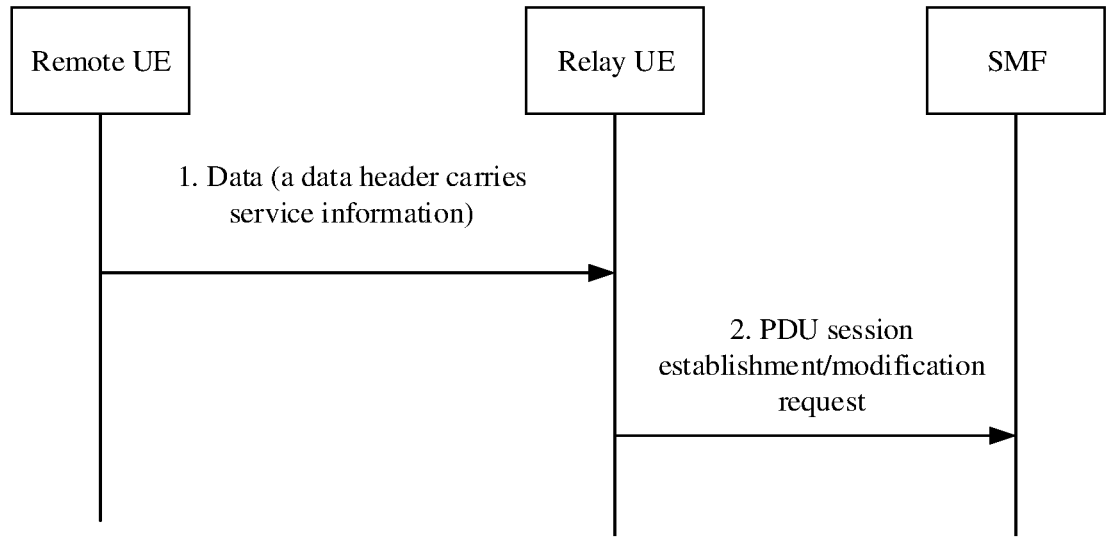
FIG. 8 is a flow chart illustrating implementation of embodiment 6 of the present disclosure.

FIG. 8 is a flow chart illustrating implementation of embodiment 6 of the present disclosure. As illustrated in FIG. 8, a remote UE and a relay UE pre-establish connection through a PC5 interface.

The remote UE transmits data to the relay UE, where a data header of the data carries service information. Specific contents of the service information have been illustrated in the above, which will not be repeated herein. The relay UE can determine a service corresponding to the received data according to the data header. Further, the relay UE can request a network device (for example, an SMF) to establish PDU session parameters or QoS parameters corresponding to the service corresponding to the received data.

In some implementation manners, the relay UE receives a Uu QoS rule from the network device (for example, the SMF), where the Uu QoS rule includes service information. The relay UE determines a service to be initiated to the remote UE according to the Uu QoS rule.

Further, the relay UE can determine QoS parameters of a PC5 QoS flow according to the service information, transmit a PC5 QoS flow establishment or modification request to the remote UE, where the PC5 QoS flow establishment or modification request carries the QoS parameters of the PC5 QoS flow. The PC5 QoS flow establishment or modification request can further carry a PC5 QoS rule, where the PC5 QoS rule includes a service filter and service information.

The above implementation manner can be applied to the scenario illustrated in FIG. 1C. The following will illustrate specific implementation manners by using embodiment 7.

Embodiment 7

Figure 9:
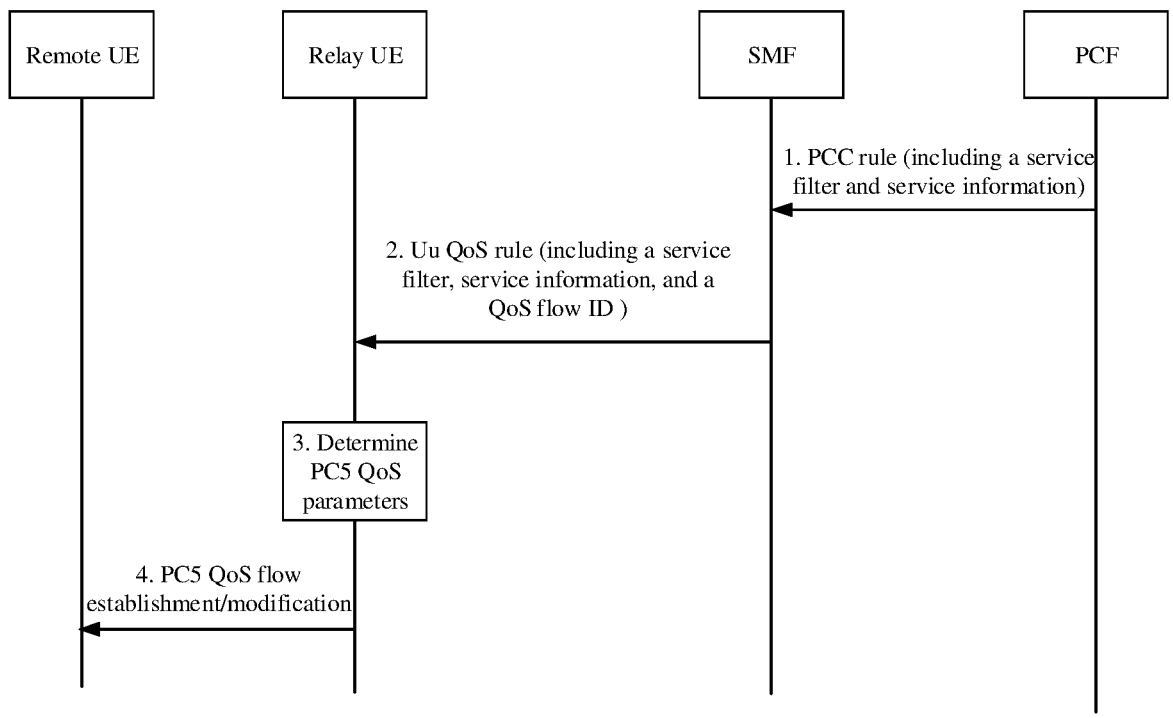
FIG. 9 is a flow chart illustrating implementation of embodiment 7 of the present disclosure.

FIG. 9 is a flow chart illustrating implementation of embodiment 7. As illustrated in FIG. 9, a network side actively initiates establishment of a QoS flow.

When initiating a service, a PCF transmits a PCC rule to an SMF, where the PCC rule includes a service filter and service information. Specific contents of the service information have been illustrated in the above, which will not be repeated herein.

The SMF determines a QoS flow corresponding to the PCC rule and generates a Uu QoS rule, where the Uu QoS rule includes the service filter, the service information, and a QoS flow ID. The SMF transmits the Uu QoS rule to the relay UE.

The relay UE determines service information of a service to be initiated to the remote UE according to the Uu QoS rule received from the SMF, such that QoS parameters of a PC5 QoS flow (for example, PC5 5G QoS ID (PQI, PC5 5QI), coding rate requirements, and so on) are determined. The relay UE can transmit to the remote UE a PC5 QoS flow establishment or modification request, where the PC5 QoS flow establishment or modification carries QoS parameters of the above PC5 QoS flow, and can also carry a PC5 QoS rule, where the PC5 QoS rule includes a service filter and service information. The remote UE determines service information corresponding to received data by performing matching on the received data by using the service filter in the PC5 QoS rule, such that the remote UE can transmit the received data to a corresponding application.

In some implementations, the relay UE receives data from a network device (such as an SMF), where a data header of the data carries service information. The relay UE determines a service corresponding to received data according to the data header.

Further, the relay UE can determine QoS parameters of a PC5 QoS flow according to the service information, and transmit a PC5 QoS flow establishment or modification request to the remote UE, where the PC5 QoS flow establishment or modification request carries QoS parameters of the PC5 QoS flow. The PC5 QoS flow establishment or modification request can further carry a PC5 QoS rule, where the PC5 QoS rule includes a service filter and service information.

The above implementation manner can be applied to the scenario illustrated in FIG. 1C. The following will illustrate specific implementation manners by using embodiment 8.

Embodiment 8

Figure 10:
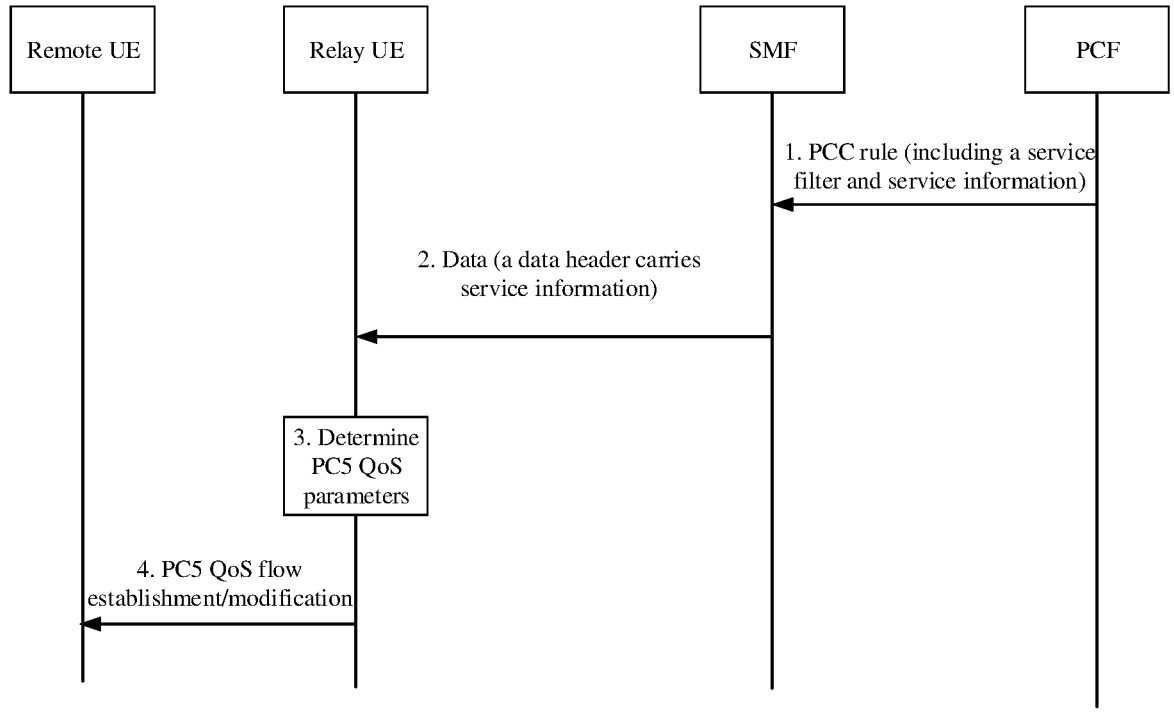
FIG. 10 is a flow chart illustrating implementation of embodiment 8 of the present disclosure.

FIG. 10 is a flow chart illustrating implementation of embodiment 8 of the present disclosure. As illustrated in FIG. 10, a network side actively initiates a QoS establishment.

When initiating a service, a PCF transmits a PCC rule to an SMF, where the PCC rule includes a service filter and service information. Specific contents of the service information have been illustrated in the above, which will not be repeated herein.

The SMF transmits data to a relay UE, where a data header of the data carries service information.

The relay UE determines service information of a service to be initiated to a remote UE according to the data header of the data received from the SMF, such that the relay UE determines QoS parameters of a PC5 QoS flow (for example, a PQI, coding rate requirements, and so on). The relay UE transmits to the remote UE a PC5 QoS flow establishment or modification request, where the PC5 QoS flow establishment or modification carries the QoS parameters of the PC5 QoS flow, and also can carry a PC5 QoS rule. The PC5 QoS rule includes a service filter and service information. The remote UE determines service information corresponding to received data by performing matching on the received data by using the service filter in the PC5 QoS rule, such that the remote UE can transmit the received data to a corresponding application.

From the above, it can be seen that in embodiments of the present disclosure, a UE receives service information, which solves the problem in the related art that the UE that receives data needs to rely on the assistance of an operating system to transmit the received data to a corresponding application, and also solves the problem that suitable PDU session parameters and QoS parameters cannot be set for a remote UE due to that a relay UE cannot determine a service to be initiated by the remote UE when the remote UE accesses a network through the relay UE in a short distance communication scenario.

Figure 11:
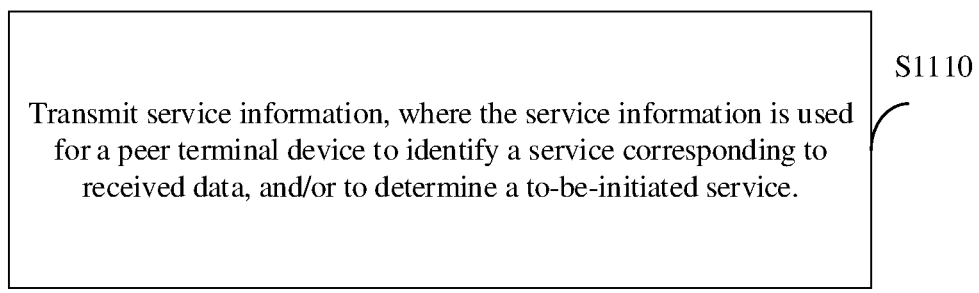
FIG. 11 is a flow chart illustrating implementation of a method 1100 for transmitting service information according to embodiments of the present disclosure.

A method for transmitting service information is further provided in embodiments of the present disclosure. The method is applied to a terminal device. FIG. 11 is a flow chart illustrating implementation of a method 1100 for transmitting service information according to embodiments of the present disclosure. The method can optionally be applied to systems illustrated in FIGS. 1A to 1C, but is not limited thereto. The method includes at least part of the following.

At S1110, transmit service information, where the service information is used for a peer terminal device to identify a service corresponding to received data, and/or determine a to-be-initiated service.

Optionally, the service information includes at least one of: a service ID, a service code, an application ID, an ID of a service provider, a service type, or other ID able to be associated with the service information.

Optionally, the other ID able to be associated with the service information can include at least one of a slice ID, a domain name, or a DSCP.

In some embodiments, transmitting the service information includes transmitting a PC5 QoS rule, where the PC5 QoS rule includes a service filter and the service information.

Optionally, transmitting the PC5 QoS rule includes transmitting a PC5 QoS flow establishment or modification request, where the PC5 QoS flow establishment or modification carries a PC5 QoS rule corresponding to a to-be-transmitted service in a to-be-established PC5 QoS flow.

In some embodiments, transmitting the service information includes transmitting data, where a data header of the data carries service information.

Figure 12:
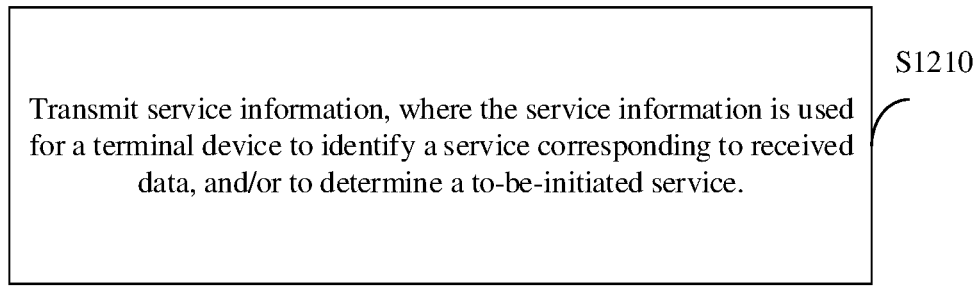
FIG. 12 is a flow chart illustrating implementation of a method 1200 for transmitting service information according to embodiments of the present disclosure.

A method for transmitting service information is further provided in embodiments of the present disclosure. The method is applied to a network device. FIG. 12 is a flow chart illustrating implementation of a method 1200 for transmitting service information according to embodiments of the present disclosure. The method can optionally be applied to systems illustrated in FIGS. 1A to 1C, but is not limited thereto. The method includes at least part of the following.

At S1210, transmit service information, where the service information is used for a terminal device to identify a service corresponding to received data, and/or determine a to-be-initiated service.

The above method can be applied to a network device such as an SMF.

Optionally, the service information includes at least one of: a service ID, a service code, an application ID, an ID of a service provider, a service type, or other ID able to be associated with the service information.

Optionally, the other ID able to be associated with the service information can include at least one of a slice ID, a domain name, or a DSCP.

Optionally, transmitting the service information includes transmitting a Uu QoS rule, where the Uu QoS rule includes a service filter and the service information.

Optionally, before transmitting the Uu QoS rule, the method further includes receiving a PCC rule and generating the Uu QoS rule according to the PCC rule, where the PCC rule includes the service filter and the service information.

Optionally, transmitting the service information includes transmitting data, where a data header of the data carries service information.

Figure 13:
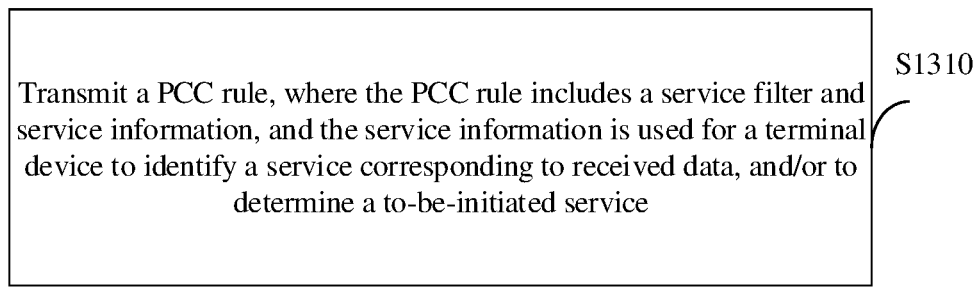
FIG. 13 is a flow chart illustrating implementation of a method 1300 for transmitting a policy and charging control (PCC) rule according to embodiments of the present disclosure.

A method for transmitting a PCC rule is further provided in embodiments of the present disclosure. The method is applied to a network device. FIG. 13 is a flow chart illustrating implementation of a method 1300 for transmitting a PCC rule according to embodiments of the present disclosure. The method can optionally be applied to systems illustrated in FIGS. 1A to 1C, but is not limited thereto. The method includes at least part of the following.

At S1310, transmit a PCC rule, where the PCC rule includes a service filter and service information, where the service information is used for the terminal device to identify a service corresponding to received data, and/or determine a to be initiated service.

The method can be applied to a network device such as a PCF.

Optionally, the service information includes at least one of: a service ID, a service code, an application ID, an ID of a service provider, a service type, or other ID able to be associated with the service information.

Optionally, the other ID able to be associated with the service information includes at least one of a slice ID, a domain name, or a DSCP.

Figure 14:
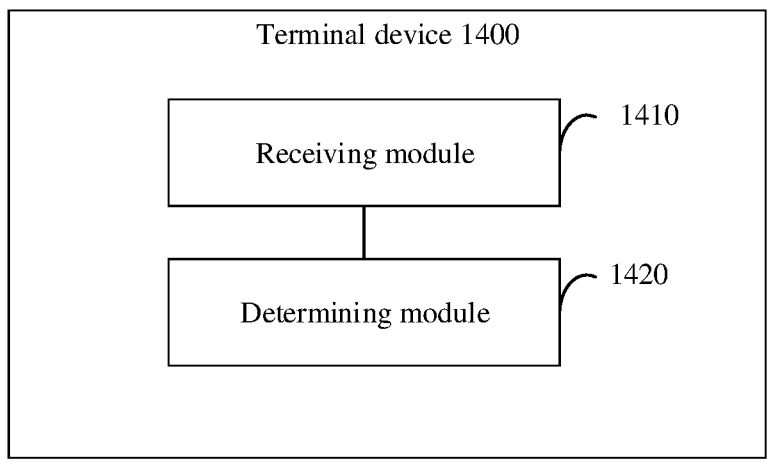
FIG. 14 is a schematic structural diagram illustrating a terminal device 1400 according to embodiments of the present disclosure.

A terminal device is further provided in embodiments of the present disclosure. FIG. 14 is a schematic structural diagram illustrating a terminal device 1400 according to embodiments of the present disclosure. The terminal device 1400 includes a receiving module 1410 and a determining module 1420. The receiving module 1410 is configured to receive service information. The determining module 1420 is configured to identify a service corresponding to received data according to the service information, and/or determine a to-be-initiated service according to the service information.

Optionally, the receiving module 1410 is configured to receive a PC5 QoS rule, a Uu QoS rule, or data, where the PC5 QoS rule, the Uu QoS rule, or a data header of the data carries the service information.

Optionally, the service information includes at least one of: a service ID, a service code, an application ID, an ID of a service provider, a service type, or other ID able to be associated with the service information.

Optionally, the other ID able to be associated with the service information includes at least one of a slice ID, a domain name, or a DSCP.

Optionally, the receiving module 410 receives a PC5 QoS rule from a peer terminal device, where the PC5 QoS rule includes a service filter and the service information. The determining module 1420 determines the service corresponding to the received data by performing matching on the received data by using the service filter.

Optionally, the receiving module 1410 receives a PC5 QoS flow establishment or modification request from the peer terminal device, where the PC5 QoS flow establishment or modification request carries a PC5 QoS rule corresponding to a to-be-transmitted service in a to-be-established PC5 QoS flow.

Optionally, the receiving module 1410 receives data from the peer terminal device, where a data header of the data carries the service information. The determining module 1420 determines the service corresponding to the received data according to the data header.

Optionally, the receiving module 1410 receives a Uu QoS rule from a network device, where the Uu QoS rule includes a service filter and the service information. The determining module 1420 determines the service corresponding to the received data by performing matching on the received data by using the service filter.

Optionally, the receiving module 1410 receives data from the network device, where a data header of the data carries the service information. The determining module 1420 determines the service corresponding to the received data according to the data header.

Optionally, the terminal device is further configured to transmit the received data to an application corresponding to the service.

Optionally, the receiving module 1410 receives a PC5 QoS rule from a remote UE, where the PC5 QoS rule includes the service information. Optionally, the determining module 1420 determines a service to be initiated by the remote UE according to the PC5 QoS rule.

Optionally, the receiving module 1410 receives a PC5 QoS flow establishment or modification request from the remote UE, where the PC5 QoS flow establishment or modification request carries a PC5 QoS rule corresponding to a to-be-transmitted service in a to-be-established PC5 QoS flow.

Optionally, the receiving module 1410 receives data from the remote UE, where a data header of the data carries the service information. The determining module 1420 determines the service corresponding to the received data according to the data header.

Optionally, the terminal device can further request the network device to establish PDU session parameters or QoS parameters corresponding to the service corresponding to the received data or the service to be initiated by the remote UE.

Optionally, the receiving module 1410 receives a Uu QoS rule from the network device, where the Uu QoS rule includes the service information. The determining module 1420 determines a service to be initiated to the remote UE according to the Uu QoS rule.

Optionally, the receiving module 1410 receives data from the network device, where a data header of the data carries the service information. The determining module 1420 determines the service corresponding to the received data according to the data header.

Optionally, the terminal device is further configured to determine QoS parameters of a PC5 QoS flow according to the service information, and transmit a PC5 QoS flow establishment or modification request to the remote UE, where the PC5 QoS flow establishment or modification request carries QoS parameters of the PC5 QoS flow.

Optionally, the PC5 QoS flow establishment or modification request further carries a PC5 QoS rule, where the PC5 QoS rule includes a service filter and the service information.

It should be understood that the above and other operations and/or functions of the modules in the terminal device according to embodiments of the present disclosure are respectively to implement corresponding procedures of the terminal device in the method 200 in FIG. 2, which will not be repeated herein for brevity.

Figure 15:
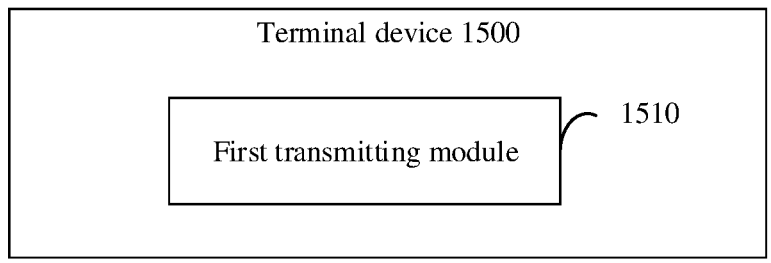
FIG. 15 is a schematic structural diagram illustrating a terminal device 1500 according to embodiments of the present disclosure.

Another terminal device is further provided in embodiments of the present disclosure. FIG. 15 is a schematic structural diagram illustrating a terminal device 1500 according to implementations of the present disclosure. The terminal device 1500 includes a first transmitting module 1510 configured to transmit service information, where the service information is used for a peer terminal device to identify a service corresponding to received data, and/or determine a to-be-initiated service.

Optionally, the service information includes at least one of: a service ID, a service code, an application ID, an ID of a service provider, a service type, or other ID able to be associated with the service information.

Optionally, the other ID able to be associated with the service information includes at least one of a slice ID, a domain name, or a DSCP.

Optionally, the first transmitting module 1510 transmits a PC5 QoS rule, where the PC5 QoS rule carries a service filter and the service information.

Optionally, the first transmitting module 1510 transmits a PC5 QoS flow establishment or modification request, where the PC5 QoS flow establishment or modification carries a PC5 QoS rule corresponding to a to-be-transmitted service in a to-be-established PC5 QoS flow.

Optionally, the first transmitting module 1510 transmits data, where a data header of the data carries the service information.

It should be understood that the above and other operations and/or functions of the modules in the terminal device according to embodiments of the present disclosure are respectively to implement corresponding procedures of the terminal device in the method 1100 in FIG. 11, which will not be repeated herein for brevity.

Figure 16:
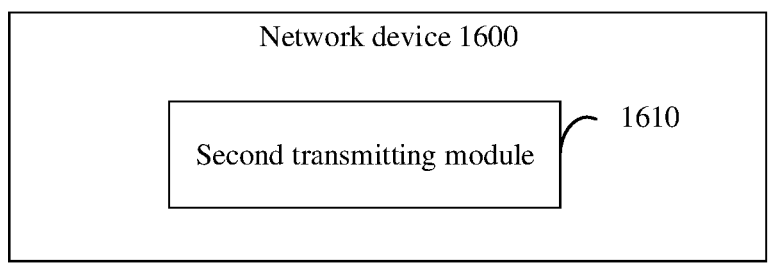
FIG. 16 is a schematic structural diagram illustrating a network device 1600 according to embodiments of the present disclosure.

A network device is further provided in embodiments of the present disclosure. FIG. 16 is a schematic structural diagram illustrating a network device 1600 according to implementations of the present disclosure. The network device 1600 includes a second transmitting module 1610 configured to transmit service information, where the service information is used for a terminal device to identify a service corresponding to received data, and/or determine a to-be-initiated service.

Optionally, the service information includes at least one of: a service ID, a service code, an application ID, an ID of a service provider, a service type, or other ID able to be associated with the service information.

Optionally, the other ID able to be associated with the service information includes at least one of a slice ID, a domain name, or a DSCP.

Optionally, the second transmitting module 1610 transmits a Uu QoS rule, where the Uu QoS rule includes a service filter and the service information.

Optionally, the network device is further configured to receive a PCC rule and generate the Uu QoS rule according to the PCC rule, where the PCC rule includes the service filter and the service information.

Optionally, the second transmitting module 1610 transmits data, where a data header of the data carries the service information.

The network device may be an SMF.

It should be understood that the above and other operations and/or functions of the modules in the network device according to embodiments of the present disclosure are respectively to implement corresponding procedure of the network device in the method 1300 in FIG. 13, which will not be repeated herein for brevity.

Figure 17:
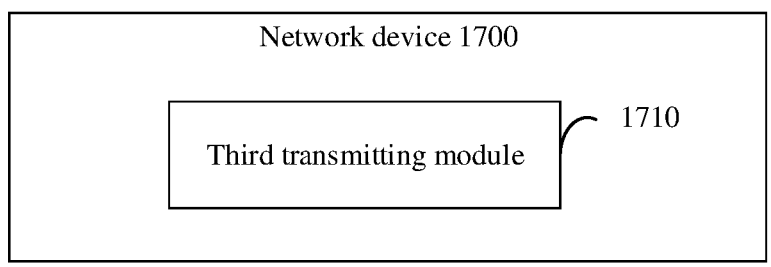
FIG. 17 is a schematic structural diagram illustrating a network device 1700 according to embodiments of the present disclosure.

A network device is further provided in embodiments of the present disclosure. FIG. 17 is a schematic structural diagram illustrating a network device 1700 according to embodiments of the present disclosure. The network device 1700 includes a third transmitting module 1710 configured to transmit a PCC rule, where the PCC rule includes a service filter and service information, and the service information is used for a terminal device to identify a service corresponding to received data, and/or determine a to-be-initiated service.

Optionally, the service information includes at least one of: a service ID, a service code, an application ID, an ID of a service provider, a service type, or other ID able to be associated with the service information.

Optionally, the other ID able to be associated with the service information includes at least one of a slice ID, a domain name, or a DSCP.

It should be understood that the above and other operations and/or functions of the modules in the network device according to embodiments of the present disclosure are respectively to implement corresponding procedures of the terminal device in the method 1300 in FIG. 13, which will not be repeated herein for brevity.

Figure 18:
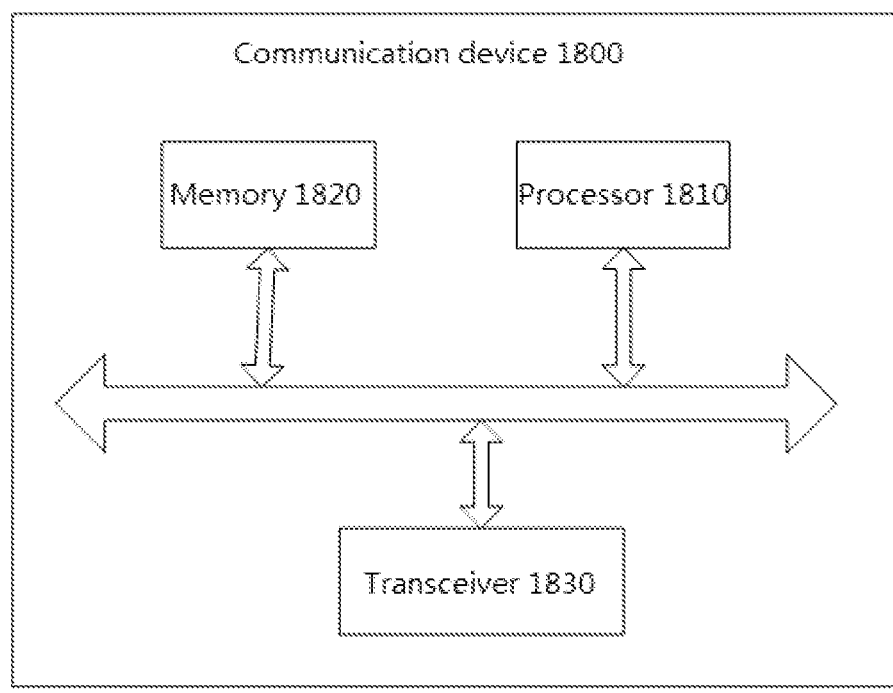
FIG. 18 is a schematic structural diagram illustrating a communication device 1800 according to embodiments of the present disclosure.

FIG. 18 is a schematic structural diagram illustrating a communication device 1800 provided in implementations of the disclosure. The communication device 1800 illustrated in FIG. 18 includes a processor 1810. The processor 1810 can invoke and execute computer programs stored in a memory, to perform the methods in embodiments of the present disclosure.

Optionally, as illustrated in FIG. 18, the communication device 1800 further includes a memory 1820. The processor 1810 can invoke and execute computer programs stored in the memory 1820, to perform the methods in embodiments of the present disclosure.

The memory 1820 may be a separate device from the processor 1810, or be integrated into the processor 1810.

Optionally, as illustrated in FIG. 18, the communication device 1800 further includes a transceiver 1830. The processor 1810 can control the transceiver 1830 to communicate with other devices, to transmit information or data to other devices, or receive information or data transmitted by other devices.

The transceiver 1830 may include a transmitter and a receiver, and further include one or more antennas.

Optionally, the communication device 1800 may be the terminal device in embodiments of the present disclosure, and the communication device 1800 can implement a corresponding process implemented by the terminal device in each of the methods of the embodiments of the present disclosure, which will not be repeated herein for the sake of simplicity.

Optionally, the communication device 1800 may be the network device in embodiments of the present disclosure, and the communication device 1800 can implement a corresponding process implemented by the communication device in each of the methods of the embodiments of the present disclosure, which will not be repeated herein for the sake of simplicity.

Figure 19:
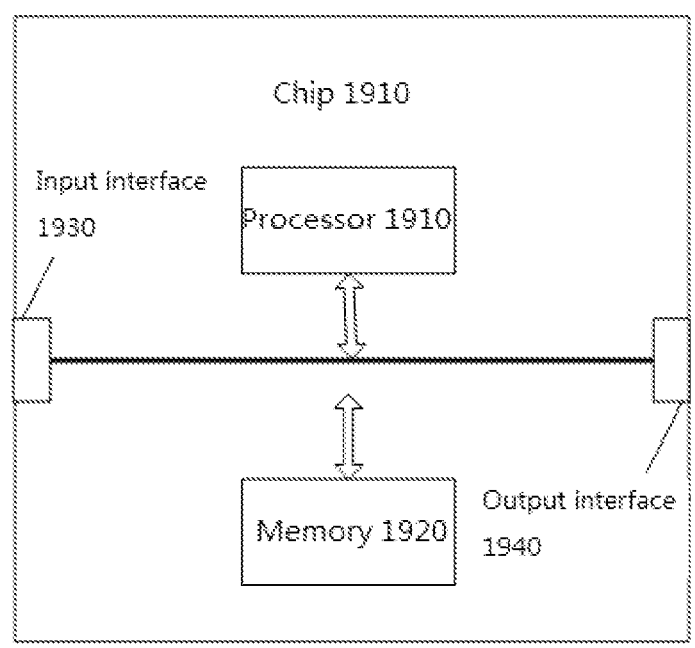
FIG. 19 is a schematic structural diagram illustrating a chip 1900 according to embodiments of the present disclosure.

FIG. 19 is a schematic structural diagram illustrating a chip 1900 provided in implementations of the disclosure. As illustrated in FIG. 19, a chip 1900 includes a processor 1910. The processor 1910 can invoke and execute computer programs stored in a memory, to perform the methods in embodiments of the present disclosure.

Optionally, as illustrated in FIG. 19, the chip 1900 further includes a memory 1920. The processor 1910 can invoke and execute computer programs stored in the memory 1920, to perform the methods in embodiments of the present disclosure.

The memory 1920 may be a separate device from the processor 1910, or be integrated into the processor 1910.

Optionally, the chip 1900 may further include an input interface 1930. The processor 1910 can control the input interface 1930 to communicate with other devices or chips. Specifically, the input interface 1930 can obtain information or data transmitted by other devices or chips.

Optionally, the chip 1900 may further include an output interface 1940. The processor 1910 can control the output interface 1940 to communicate with other devices or chips. Specifically, the output interface 1940 can output information or data to other devices or chips.

Optionally, the chip can be applied to the terminal device in embodiments of the present disclosure, and the chip can implement a corresponding process implemented by the terminal device in each of the methods in the embodiments of the present disclosure, which will not be repeated herein for the sake of simplicity.

Optionally, the chip can be applied to the network device in the embodiments of the present disclosure, and the chip can implement a corresponding process implemented by the network device in each of the methods in embodiments of the present disclosure, which will not be repeated herein for the sake of simplicity.

It can be understood that, the chip mentioned in embodiments of the present disclosure may also be called a system-level chip, a system chip, a chip system, a system-on-a-chip chip, or the like.

The above-mentioned processor may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically EPROM (EEPROM) or a flash memory. The volatile memory may be a random access memory (RAM).

It should be understood that the above-mentioned memory is an example but not a limitation. For example, the memory in the embodiment of the present disclosure may also be a static random access memory (SRAM), a dynamic random access memory (DRAM), a synchronous dynamic random access memory (SDRAM), a double data rate SDRAM (DDR SDRAM), an enhanced SDRAM (ESDRAM), a synch link DRAM (SLDRAM), a direct rambus RAM (DR RAM), and so on. That is, the memory in embodiments of the present disclosure is intended to include but not limited to these and any other suitable types of memory.

The above-mentioned embodiments can be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from a website, computer, server, or data center to another website, computer, server, or data center in a wired manner (e.g., coaxial cable, optical fiber, digital subscriber line (DSL)) or a wireless manner (e.g., infrared, wireless, microwave, etc.). The computer-readable storage medium can be any available medium that can be accessed by a computer or a data storage device such as a server, data center, etc. that includes one or more available media integrated. The available media may be magnetic media (e.g., floppy disks, hard disks, magnetic tapes), optical media (e.g., DVD), or semiconductor media (e.g., solid state disk (SSD)), and the like.

It should be understood that, in various embodiments of the present disclosure, the magnitude of the sequence numbers of the above-mentioned processes does not mean the sequence of execution, and the execution sequence of each process should be determined by its functions and internal logic, and should not constitute any limitation on implementation processes of the embodiments of the present disclosure.

Those skilled in the art can clearly understand that, for the convenience and brevity of illustration, for the specific work process of the above-described systems, devices, and units, reference can be made to the corresponding processes in the foregoing method embodiments, which will not be repeated herein.

The above are only specific embodiments of the present disclosure, but the protection scope of the present disclosure is not limited to this. Any person skilled in the art can easily think of changes or substitutions within the technical scope disclosed in the present disclosure, and the changes or substitutions shall be within the scope of protection of the present disclosure. Therefore, the protection scope of the present disclosure shall be subject to the protection scope of the claims.

What is claimed is:

1. A method for service identification, being executed by a terminal device and comprising:
   receiving a PC5 quality of service (QOS) rule from a peer terminal device, wherein the PC5 QOS rule comprises a service filter and service information; and
   determining a service corresponding to received data by performing matching on the received data by using the service filter;
   wherein receiving the PC5 QoS rule from the peer terminal device comprises:
      receiving a PC5 QoS flow establishment or modification request from the peer terminal device, wherein the PC5 QoS flow establishment or modification request carries the PC5 QoS rule corresponding to a to-be-transmitted service in a to-be-established PC5 QoS flow or in a to-be-modified PC5 QoS flow.

2. The method of claim 1, wherein the service information comprises at least one of:
   a service identifier (ID); or
   an application ID.

3. The method of claim 1, wherein the service information comprises at least one of:
   a service ID;
   a service code;
   an application ID;
   an ID of a service provider; or
   a service type.

4. The method of claim 1, wherein the service information comprises other ID able to be associated with the service information, wherein the other ID able to be associated with the service information comprises at least one of a slice ID or a differentiated services code point (DSCP).

5. The method of claim 1, further comprising:
   transmitting the received data to an application corresponding to the service.

6. A method for transmitting service information, being executed by a terminal device and comprising:
   transmitting a PC5 quality of service (QoS) rule to a peer terminal device, wherein the PC5 QoS rule comprises a service filter and service information, wherein the service filter is used for the peer terminal device to perform matching on received data to determine a service corresponding to the received data-;
   wherein transmitting the PC5 QoS rule comprises:
      transmitting a PC5 QoS flow establishment or modification request to the peer terminal device, wherein the PC5 QoS flow establishment or modification request carries the PC5 QoS rule corresponding to a to-be-transmitted service in a to-be-established PC5 QoS flow or in a to-be-modified PC5 QoS flow.

7. The method of claim 6, wherein the service information comprises at least one of:
   a service identifier (ID); or
   an application ID.

8. The method of claim 6, wherein the service information comprises at least one of:
   a service ID;
   a service code;
   an application ID;
   an ID of a service provider; or
   a service type.

9. The method of claim 6, wherein the service information comprises other ID able to be associated with the service information, wherein the other ID able to be associated with the service information comprises at least one of a slice ID or a differentiated services code point (DSCP).

10. A terminal device comprising:
    a transceiver;
    a processor; and
    a memory storing computer programs which, when executed by the processor, cause the transceiver to receive a PC5 service of quality (QoS) rule from a peer terminal device, wherein the PC5 QOS rule comprises a service filter and service information;
    the computer programs being further executed by the processor to cause the processor to determine a service corresponding to received data by performing matching on the received data by using the service filter;
    wherein the computer programs causing the transceiver to receive the PC5 QoS rule are further executed by the processor to cause the transceiver to receive a PC5 QoS flow establishment or modification request from the peer terminal device, wherein the PC5 QoS flow establishment or modification request carries the PC5 QoS rule corresponding to a to-be-transmitted service in a to-be-established PC5 QoS flow or in a to-be-modified PC5 QoS flow.

11. The terminal device of claim 10, wherein the service information comprises at least one of:
    a service identifier (ID); or
    an application ID.

12. The terminal device of claim 10, wherein the computer programs are further executed by the processor to cause the transceiver to:
    transmit the received data to an application corresponding to the service.

13. The terminal device of claim 10, wherein the service information comprises at least one of:
    a service ID;
    a service code;
    an application ID;
    an ID of a service provider; or
    a service type.

14. The terminal device of claim 13, wherein the service information comprises other ID able to be associated with the service information, wherein the other ID able to be associated with the service information comprises at least one of a slice ID or a differentiated services code point (DSCP).

\* \* \* \* \*